M. C. COSGRAY.
ELECTRIC SYSTEM.
APPLICATION FILED JAN. 30, 1919.
1,350,437.
Patented Aug. 24, 1920.
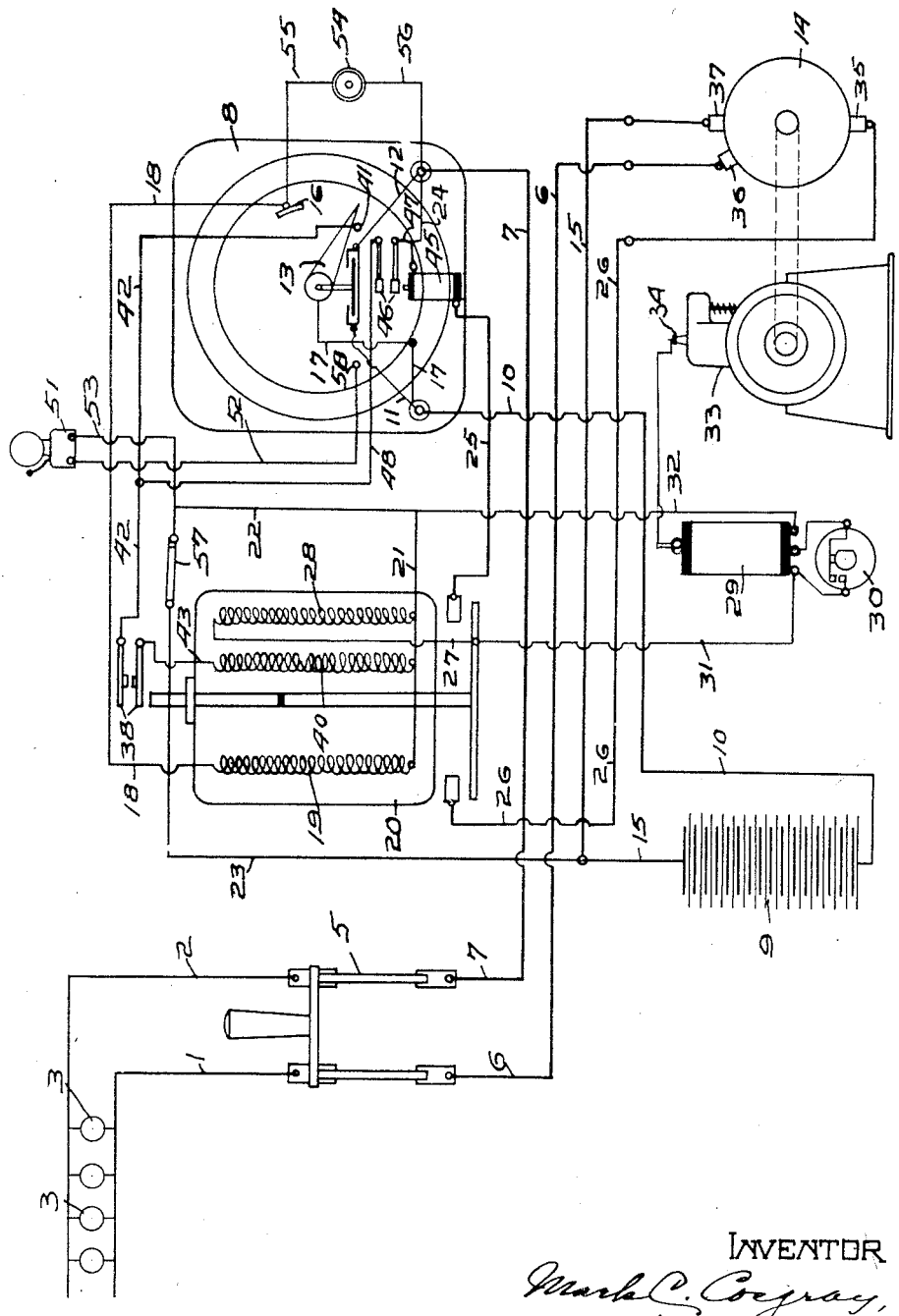
INVENTOR
Marla C. Cosgray,
by
Owen, Owens & Crampton

UNITED STATES PATENT OFFICE.

MARK C. COSGRAY, OF SANDUSKY, OHIO, ASSIGNOR TO THE MATTHEWS ENGINEERING COMPANY, OF SANDUSKY, OHIO, A CORPORATION OF OHIO.

ELECTRIC SYSTEM.

1,350,437. Specification of Letters Patent. Patented Aug. 24, 1920.

Application filed January 30, 1919. Serial No. 274,066.

*To all whom it may concern:*

Be it known that I, MARK C. COSGRAY, a citizen of the United States, and a resident of Sandusky, in the county of Erie and State of Ohio, have invented a certain new and useful Electric System; and I do hereby declare the following to be a full, clear, and exact description of the invention, such as will enable others skilled in the art to which it appertains to make and use the same, reference being had to the accompanying drawing, and to the characters of reference marked thereon, which forms a part of this specification.

My invention has for its object to provide, in connection with an electric system, wherein the translating devices are supplied with current either from a storage battery or, under certain conditions, from a storage battery and a dynamo and wherein the storage battery is charged by the current from the dynamo, a means whereby the potential of the line will be maintained at a constant value notwithstanding whether the source of supply is the storage battery or the storage battery and the dynamo or even from the dynamo alone.

It also provides a means, in connection with such a system, whereby the potential produced by the dynamo on the line will be the same as the potential produced on the line by the battery and the potential produced by the dynamo in charging the battery will be sufficiently larger than that produced on the line by the battery or the dynamo, so that the counter electromotive force of the battery will be readily overcome and the battery charged by the current having the larger potential.

The invention further provides in connection with a system wherein translating devices are fed either by a battery or a dynamo, or both, and wherein the dynamo is driven by an internal combustion engine, and wherein the engine is under certain conditions automatically started by the dynamo operating as a motor, a means whereby the dynamo will be permitted to operate during an ample, but a comparatively short, time, as a motor to get the engine started and upon the expiration of that time the operation of the dynamo as a motor will cease and thus prevent excessive discharge of the battery. The invention provides other features which will appear in the following specification and upon an examination of the drawings.

The invention also provides electric intercontrolling devices whereby the battery will be protected from excessive discharge.

The invention may be contained in systems of different forms and used for different purposes. To illustrate the connections and devices that embody the invention, I have selected one of such systems and shall describe the same hereinafter.

The system selected for purposes of illustration is shown in the drawing.

1, 2, in the figure, indicate the main lines having translating devices 3 of any form, as illustrated conventionally on the drawing. 5 is a switch that connects the lines 6 and 7 with the main lines 1 and 2. A coulomb or ampere-hour meter 8 is connected to the line 7 and to the storage battery 9 through the line 10, the connection through the meter being made through the lines 10, 11, 12 and 7, so that the current from the battery to the translating devices passes through the meter and rotates the pointer 13. The return line from the translating device is through the line 6 to the dynamo 14, and the line 15 to the battery 9. The storage battery thus supplies the translating devices with its current, and the pointer 13 in the meantime moves counter-clockwise over the dial of the meter 8.

When, however, the pointer or contact 13 reaches a certain point on the dial which indicates that the battery has been discharged to a certain point, and that it should be charged by the dynamo 14, connections are made by automatic inter-controlling switches whereby the dynamo will be operated and charge the storage battery. Further discharge of the battery beyond this point may not seriously injure the battery, but the point is selected so as to keep the battery safely charged, and when the battery is discharged to this point, if the consumption of the current is in excess to that which can be reasonably supplied by the battery, the lines may be supplied by current from both the storage battery and the dynamo. To this end a contact 16 is located at the point of safe discharge of the battery. When the contact 13 makes contact with the contact 16, a circuit is established from the battery through the lines 10, 17, 18 and the coil 19 of the master controller switch 20. The circuit from the coil 19 is completed to the battery through the lines 21, 22, 23 and 15. This will cause the switch of the master controller to be closed and complete the circuit from the battery through the lines 10, 17, 24, 25, 26 and 15 to the battery. In this circuit is located the dynamo 14 which is a shunt wound dynamo, and the dynamo will thereupon operate as a motor.

A circuit will also be completed by the operation of the coil 19 through a coil 28 from the battery through the lines 10, 17, 24, 25, 27, 21, 22, 23 and 15. The coil 28 will operate as a retaining coil to retain the master switch closed notwithstanding the removal of the contact or pointer 13 from the contact 16 under certain conditions, as hereinafter described.

The master controller, also by the operation of the coil 19, closes a circuit through an engine ignition coil 29 and a circuit breaker or timer 30 from the battery 9 through the lines 10, 17, 24, 25, 31, 32, 22, 23 and 15. The engine 33 is connected to the shaft of the dynamo 14, and its spark plug 34 is suitably connected with the induction coil 29 and circuit-breaker 30 so as to produce the proper ignition of the fuel. Rotation of the crank shaft of the engine by the operation of the dynamo 14 operating as a motor, causes, if the parts of the engine are in operative condition, the engine to drive the shaft of the dynamo 14 and the dynamo to operate as a generator and produce a current.

The dynamo 14 is provided with three brushes 35, 36 and 37 that make contact at three different points on the commutator of the dynamo and consequently there is produced between the brush 35 and the other two brushes, two differences of potential. The difference in potential between the brushes 35 and 36 is substantially same as the potential of battery when the battery is furnishing current to translating devices. The turns between the brushes 35 and 36 are connected with the line in parallel with the storage battery and consequently may coact with the storage battery in supplying current to the translating devices of the line, the connection being made from the line 1 through the line 6, brushes 36, 35, lines 26, 25, 24 and 7 to the line 2. The turns of the armature between the brushes 36 and 37 are in series with the battery so that difference of potential between the brushes 35 and 37, however, is greater than the potential of the battery, whereby the dynamo operating as a generator will readily charge the storage battery. The dynamo is connected to the storage battery through the brushes 35 and 37 by the line 15 and the lines 26, 25, 24 and 10.

As the storage battery 9 is charged by the greater difference in potential the current passes through the meter 8 and causes the pointer or contact 13 to move from the contact 16 and rotate it clockwise until the pointer reaches the point on the dial of the meter, which indicates that the storage battery is fully charged, whereupon the charging action of the dynamo 14 may be automatically terminated.

When the master controller switch 20 is operated by the coil 19, a switch or a pair of contacts 38 are closed. The contacts 38 are connected in series with a coil 40 and a contact 41 which is located at the fully charged point on the meter 8. The contact 41 is connected to the switch 38 and the coil 40 through the lines 42 and 43. When, therefore, the pointer or contact 13 reaches the fully charged point of the battery, as indicated on the meter, the circuit is completed from the battery by the contacts 13 and 41 to which are connected the switch or contacts 38 and the coil 40 through the lines 10, 11, 17 and the lines 42, 43, 21, 22, 23 and 15. The coil 40 is so wound as to produce lines of force in a direction opposite to that produced by the coils 19 and 28. It thus constitutes a kick coil and operates to open the master switch 20, whereupon the ignition system of the engine through the lines 10, 12, 24, 25, 31, 32, 22, 23 and 15 is opened and the engine 33 will cease to function. The connection also between the generator and the battery and main line is opened, the line 26 being disconnected from the line 25.

If translating devices are still on the line they will continue to receive their current from the storage battery or if at some future time the translating devices are used, they will be supplied with current from the battery.

If, however, the engine fails to function when it is started by the contact 13 making contact with the contact 16, the connection between the battery and the dynamo operating as a motor will be opened, after sufficient opportunity has been given for repeated rotations of the engine shaft. In the meantime, however, the pointed or contact 13 is moving counter-clockwise over the dial of the meter 8. For this purpose, the contact 16 is made of a length sufficient to give full opportunity for the engine to start to drive the dynamo. If, however, the engine is not converted from a motor to a generator during that time, the connections between the battery and the dynamo operating as a motor, will be opened when the contact 13 leaves the contact 16 while moving counter-clockwise. While the dynamo is operating as a motor, the circuit from the battery passes through a polarized magnetic switch 45 through the lines 10, 11, 12, 24, 25, 26 and the line 15. The contacts 46 of the switch are connected to the contacts 38 and the kick coil 40 and to the battery through the lines 10, 11, 12, 24, 47, 48, 42, 43, 21, 22, 23 and 15. In advance of that operation however, the circuit is established through the contacts 13 and 16 which complete a circuit from the battery through the coil 28 and the closed switch 38. The two coils 19 and 28 operate together but in advance of establishing the current through the circuit of the coil 40, and although the coil 40 is a kick coil and operates counter to the coils 19 and 28, yet as long as the two coils 19 and 28 are acting together they overcome the action of the coil 40. The coil 45 being polarized, its contacts are closed as long as the battery is supplying current to the dynamo to cause it to operate as a motor, but the instant that the motor is converted into a generator, the current flows in the opposite direction from the dynamo to the storage battery and the contacts 46 of the polarized switch 45 are separated, and consequently the circuit through the kick coil 40 is opened, but if the engine fails to function, the contact 13 leaves the contact 16 counter-clockwise and opens the circuit through the coil 19, while the circuit through the coil 40 continues to remain closed through the contacts 46, and the coil 40 will operate to open the master switch when the contact or pointer 13 leaves the contact 16 counter-clockwise, its action on the armature of the master switch being sufficiently great to overcome the coil 28, which alone is left in the circuit. If the engine functions and converts the motor into a dynamo before the contact 13 leaves the contact 16 the current through the polarized switch 45 is reversed and the circuit through the coil 40 is opened, thus preventing the master switch from being opened, although the pointer 13 leaves the contact 16, but leaves it clockwise. This leaves the coil 28 alone in the circuit which continues to hold the master switch closed until the pointer 13 reaches the contact 41 which brings into operation the kick coil 40, as described above. This then opens the master switch and the connections between the generator and the line and between the generator and the battery.

If, however, for any reason whatsoever, such as leakage, short circuit or open circuit of some form, the contactor 20 should not close when 13 reaches 16 and the battery should continue to discharge beyond the safe battery discharge point, the pointer of the meter will eventually reach the contact 50 and the circuit will be completed from the battery to the electric bell 51 through the lines 10, 17, 52, 53, 23 and 15. This will sound the alarm when the battery is quite fully discharged and will call attention to its condition.

If desired the battery may be charged at any time, unless the pointer is at the full charge point as indicated on the indicator, that is, unless the pointer 13 is in contact with the contact 41, by the operation of the push button 54. The push button 54 is in a circuit that bridges the contacts 13 and 16, the push button 54 being connected with the contact 16 by the line 55 and with the contact 13 by the lines 56, 12, 11 and 17.

Also the return lead from the induction coil and the coils of the master switch may be controlled by the switch 57, whereby the master switch may be opened at any time it may be desired to stop the operation of the system, and to prevent, if desired, the automatic operation of the system.

I claim:

1. In an electric system, translating devices, a battery, an ampere-hour meter, a dynamo connected to the battery and the meter, an engine connected to the shaft of the dynamo, a switch for opening and closing the electric connection and having a coil connected to the meter and operated when the meter reaches a predetermined point to close the switch, the switch having a second coil for maintaining the switch closed, the switch having a third coil operating to open the switch when a predetermined quantity of electricity passes through the meter in one direction and when a predetermined quantity of electricity passes through the meter in the opposite direction.

2. In an electric system, translating devices, a battery, an ampere hour meter having circuit closing contacts and connected in the circuit of a battery, a dynamo connected to the battery, an engine connected to the shaft of the dynamo, a switch having a coil connected to one of the contacts of the meter and operating to close the switch and a coil connected to another contact of the meter for opening the switch, a polarized switch located in the circuit of the last named coil and connected to the dynamo and operating to close the circuit through the last named coil when current and the dynamo is in one direction and to open the circuit through the last named coil when the current to the dynamo is in the opposite direction, the first named switch having a third coil connected to a contact of the meter and operating to open the first named switch when the battery reaches a predetermined point in its charged condition.

3. In an electric system, translating devices, an ampere hour meter having circuit closing contacts and connected in a circuit of the battery, a dynamo connected to the battery, an engine connected to the shaft of the dynamo, a switch for opening and closing the electric connection between the battery and the dynamo and having a coil connected to one of the contacts of the meter and operating to close the switch and a coil for maintaining the switch in closed position and a coil for opening the switch, the last named coil having strength sufficient to overcome the second named coil and insufficient to overcome the first and second named coils, means for opening the circuit of the first named coil to open the switch while the last named coil is energized.

4. In an electric system, translating devices, a battery, an ampere hour meter having circuit closing contacts and connected in a circuit of the battery, a dynamo connected to the battery, an engine connected to the shaft of the dynamo, a switch for opening and closing the electric connection between the battery and the dynamo and having a coil connected to a contact meter and operating to close the switch and a coil for maintaining the switch in closed position and a coil connected to a contact of the meter for opening the switch, the last named coil having strength sufficient to overcome the second named coil but insufficient to overcome the first and second named coils, means for opening the circuit of the last named coil when the current passes to the dynamo in one direction and to close the circuit of the last named coil when the current passes in the opposite direction.

5. An electric system, translating devices, a battery, an ampere hour meter having circuit closing contacts and connected in a circuit of the battery, a dynamo connected to the battery, an engine connected to the shaft of the dynamo, a switch for opening and closing the electric connection between the dynamo and the battery having a coil connected to a contact of the meter and operating to close the switch, a coil for maintaining the switch in closed position and a coil connected to a contact of the meter for opening the switch, the last named coil having a strength sufficient to overcome the second named coil, but insufficient to overcome the first and second named coils, means for opening the circuit of the last named coil when the current passes to the dynamo in one direction and to close the circuit of the last named coil when the current passes in an opposite direction, the meter having a means for opening the circuit of the first named coil.

In testimony whereof, I have hereunto signed my name to this specification.

MARK C. COSGRAY.